(12) United States Patent
Wassen et al.

(10) Patent No.: US 12,350,968 B2
(45) Date of Patent: Jul. 8, 2025

(54) SUSTAINABLE TIRE

(71) Applicant: The Goodyear Tire & Rubber Company, Akron, OH (US)

(72) Inventors: Marine Sophie Francoise Wassen, Mersch (LU); Jean-Noel Marsat, Hagen (LU); Karmena Izabela Anyfantaki, Helmsange (LU); Luisa Fernanda Munoz Mejia, Troine (LU); Bartosz Zielinski, Steinsel (LU); Robert Vincent Dennis-Pelcher, Uniontown, OH (US); Justin Yinket Che, Wadsworth, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 530 days.

(21) Appl. No.: 17/933,205

(22) Filed: Sep. 19, 2022

(65) Prior Publication Data

US 2024/0109369 A1    Apr. 4, 2024

(51) Int. Cl.
*B60C 1/00*    (2006.01)
*C08L 7/00*    (2006.01)
*C08L 9/06*    (2006.01)

(52) U.S. Cl.
CPC ......... *B60C 1/0016* (2013.01); *B60C 1/0008* (2013.01); *B60C 1/0025* (2013.01);
(Continued)

(58) Field of Classification Search
CPC ... B60C 1/0016; B60C 1/0008; B60C 1/0025; B60C 2001/005; B60C 2001/0066;
(Continued)

(56) References Cited

U.S. PATENT DOCUMENTS 9,771,469 B2    9/2017    Sandstrom et al.
10,519,300 B2   12/2019   Brace
(Continued)

FOREIGN PATENT DOCUMENTS

EP    1288022 A1 *  3/2003  .............. B60C 1/00
WO   2011075534 A2   6/2011

OTHER PUBLICATIONS

Extended European Search Report for Application No. 23186790.4, dated Jan. 22, 2024.

*Primary Examiner* — Doris L Lee
(74) *Attorney, Agent, or Firm* — Mandy B. Willis

(57) ABSTRACT

A tire having a tread comprising a tread rubber composition comprising from 10 phr to 100 phr of styrene butadiene rubber comprising monomers selected from one or more of recycled and bio-based monomers, from 0 phr to 90 phr of elastomers selected from one or more of natural rubber, polybutadiene rubber comprising monomers selected from one or more of recycled and bio-based monomers, and synthetic polyisoprene comprising monomers selected from one or more of recycled and bio-based monomers, and from 40 phr to 250 phr of a filler comprising one or more of recycled or bio-based silica, and recycled or bio-based carbon black, from 1 phr to 90 phr of hydrocarbon resin which is one or more of i) based on recycled monomers, bio-based monomers or a combination thereof, and ii) a plant resin. Furthermore, the tire comprises reinforced rubber plies, comprising cords, optionally made of a bio-based or recycled material, coated with a rubber coating composition comprising from 80 phr to 100 phr of elastomers selected from one or more of natural rubber and synthetic polyisoprene comprising monomers selected from one or more of recycled and bio-based monomers, and from 30 phr (Continued)

to 90 phr of a filler comprising one or more of recycled or bio-based silica and recycled or bio-based carbon black.

17 Claims, 1 Drawing Sheet

(52) U.S. Cl.
CPC .................................. *C08L 7/00* (2013.01); *C08L 9/06* (2013.01); *B60C 2001/005* (2013.01); *C08L 2201/06* (2013.01); *C08L 2207/20* (2013.01)

(58) Field of Classification Search
CPC ..... B60C 9/09; C08L 7/00; C08L 9/06; C08L 2201/06; C08L 2207/20; C08L 23/22; C08L 93/00; C08L 15/00; C08L 91/06; C08L 97/005; C08K 3/36; C08K 5/548; C08K 5/09; C08K 3/06

See application file for complete search history.

(56) References Cited

U.S. PATENT DOCUMENTS

| | | |
|---|---|---|
| 2003/0100661 A1 | 5/2003 | Kikuchi |
| 2007/0142529 A1* | 6/2007 | Uesaka .................... C08K 3/22 524/492 |
| 2010/0130663 A1* | 5/2010 | Taguchi ................ B60C 1/0016 524/432 |
| 2013/0289183 A1 | 10/2013 | Kerns et al. |
| 2014/0135424 A1 | 5/2014 | Sandstrom et al. |
| 2014/0135437 A1 | 5/2014 | Sandstrom et al. |
| 2015/0107733 A1 | 4/2015 | Sandstrom |
| 2018/0148567 A1 | 5/2018 | Papakonstantopoulos et al. |
| 2019/0225778 A1 | 7/2019 | Weydert et al. |
| 2020/0094623 A1 | 3/2020 | Isitman |
| 2020/0399448 A1 | 12/2020 | Tahon et al. |
| 2021/0024739 A1 | 1/2021 | Jacoby |
| 2022/0204351 A1 | 6/2022 | Hahn et al. |
| 2023/0151189 A1 | 5/2023 | Singh et al. |

* cited by examiner

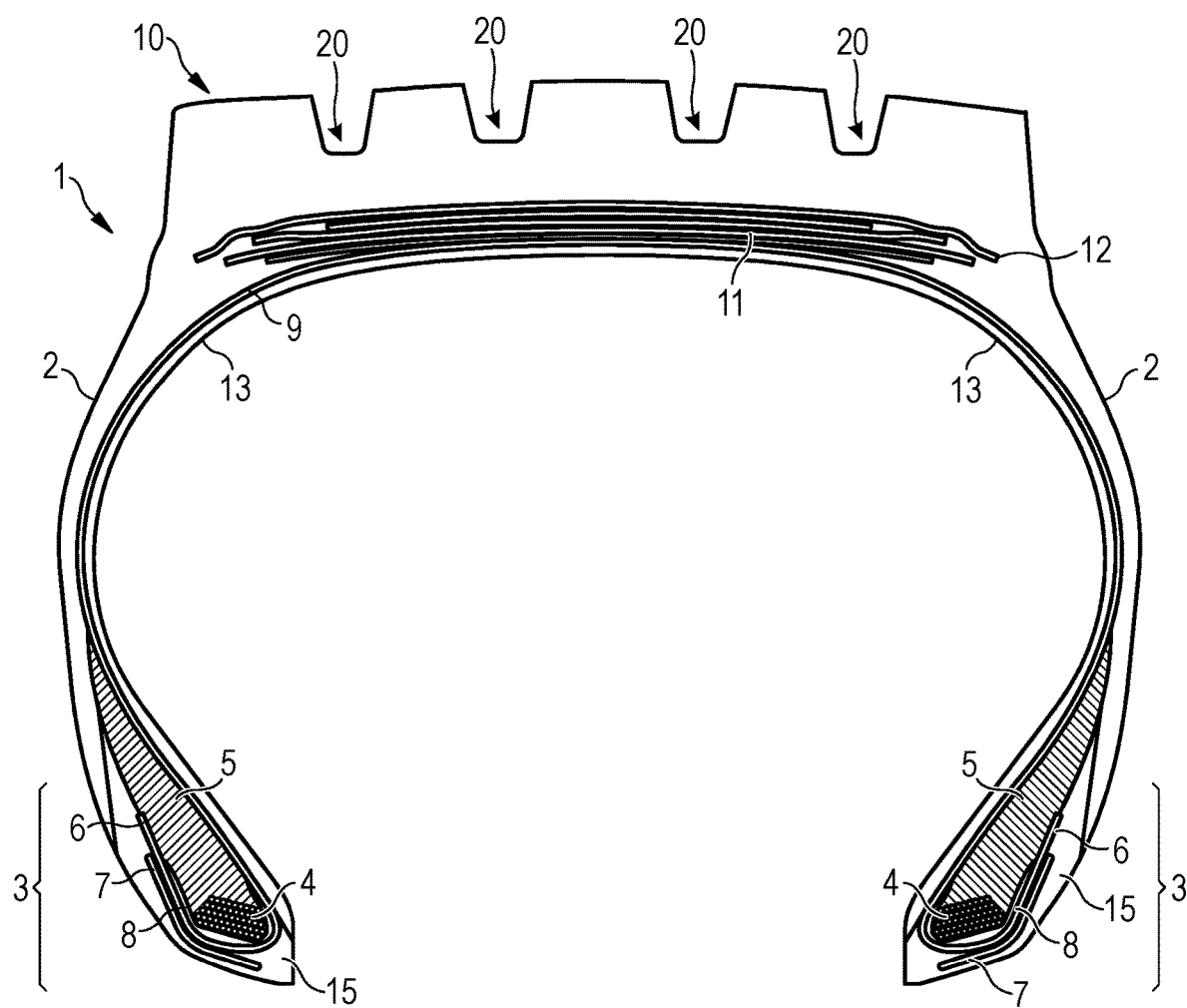

SUSTAINABLE TIRE

FIELD OF THE INVENTION

The present invention is directed to a tire, such as a passenger car or truck tire.

BACKGROUND OF THE INVENTION

Tire performance has improved significantly over the past decades. In particular, wet grip, rolling resistance and abrasion properties have been substantially improved and resulted in safer and well performing tires. However, in view of environmental considerations, and sometimes also in view of potential material shortages, there is a strong interest to provide such or similar tires as sustainable as possible.

SUMMARY OF THE INVENTION

One object of the present invention may be to provide a more sustainable tire.

The present invention is defined by the scope of claim 1. Optional embodiments are provided in the dependent claims and the summary of the invention herein below.

Thus, in a first aspect of the present invention, a tire is provided, the tire comprising multiple tire components including: A) a tread comprising a tread rubber composition (or a first rubber composition) comprising from 10 phr to 100 phr of styrene butadiene rubber comprising monomers selected from one or more of recycled and bio-based monomers, from 0 phr to 90 phr of elastomers selected from one or more of natural rubber, polybutadiene rubber comprising monomers selected from one or more of recycled and bio-based monomers, and (synthetic) polyisoprene comprising monomers selected from one or more of recycled and bio-based monomers, from 40 phr to 250 phr of a filler comprising, preferably predominantly, one or more of i) recycled or bio-based silica, and ii) recycled or bio-based carbon black, from 1 phr to 200 phr (preferably 1 phr to 90 phr) of hydrocarbon resin which is one or more of i) based on recycled monomers, bio-based monomers or a combination thereof, and ii) a plant resin. Furthermore, the tire comprises B) reinforced rubber plies comprising cords, optionally made of a bio-based or recycled material, coated with a rubber coating composition (or in other words a second rubber composition, which is different from the first rubber composition) comprising from 80 phr to 100 phr of elastomers selected from one or more of natural rubber and (synthetic) polyisoprene comprising monomers selected from one or more of recycled and bio-based monomers, from 30 phr to 90 phr of a filler comprising, preferably predominantly, one or more of i) recycled or bio-based silica and ii) recycled or bio-based carbon black.

This combination of features in the tire, in particular in the tire components tread and reinforced rubber plies (such as one or more of: one or more belt plies, one or more carcass plies, one or more overlay plies, one or more breaker plies, and one or more overlay ply strips) provides a tire with a high degree of sustainability. While the ingredients in the rubber compositions have been known as such, they have not been used in the present combination before.

In one embodiment, the rubber coating composition further comprises from 0.1 phr to 20 phr (preferably from 0.5 phr to 15 phr) of plasticizer comprising one or more of a) oil which is one or more of i) based on recycled monomers, bio-based monomers or a combination thereof, and ii) vegetable oil, b) hydrocarbon resin which is one or more of i) based on recycled monomers, bio-based monomers or a combination thereof, and ii) a plant resin, and c) liquid olefinic polymers based on recycled monomers, bio-based monomers or a combination thereof. Preferably, the rubber coating composition comprises from 0.5 phr to 10 phr of vegetable oil.

In another embodiment, one or more of the styrene butadiene rubber, the butadiene rubber, and the polyisoprene, comprises monomers selected from one or more of recycled and bio-based monomers, wherein the recycled monomers are made by reclaimed/used (polymer/material) feedstocks, such as from one or more of PVC (waste), tires/end-of-life tire waste, pyrolysis oil (such as from end-of-life tires and/or plastic waste). In addition, or alternatively, bio-based monomers can be obtained from feedstocks comprising one or more of vegetable oil, vegetable fat, animal fat, vegetable oil processing waste (such as palm fatty acid distillate, spent bleaching earth oil, palm effluent sludge), natural rubber, and biomass such as plant waste, beetroots, sugarcane, plant sugars, switchgrass, and corn. For instance butadiene or isoprene monomers can be obtained, by known methods, based on biomass, in particular on plant sugars. Once the desired monomers have been obtained, as known to the person skilled in the art, they can be used in known polymerization processes to make new styrene butadiene rubber, butadiene rubber and/or polyisoprene. It is also possible that said rubbers or polyisoprene are not made completely out of recycled monomers and/or bio-based monomers, by optionally using also partially fossil feedstocks. For example, as also known in the art, a mass balance method may be used to provide rubbers, oils and/or resins herein. In addition, or alternatively, hydrocarbon resin monomers, can also be made based on the same materials listed herein. The same applies to liquid olefinic polymers. Liquid means herein that a material is in a liquid state at 23° C.

Preferably, the amount of recycled and/or bio-based monomers in a rubber, polyisoprene, resin, liquid olefinic polymer or oil is at least 30%, even more preferably at least 50% or yet more preferably at least 70% or even 100%.

In another embodiment, one or more of the rubber compositions comprise recycled silica. Recycled silica includes for example one or more of silica made from mining (waste) material, glass (waste), and tires.

In another embodiment, one or more or the rubber compositions comprise bio-based silica. Bio-based silica includes for example one or more of rice husk ash silica, and sugarcane ash silica Preferably, the silica used is rice husk ash silica.

In another embodiment, the carbon black is a recycled carbon black. Such carbon black can for instance be obtained from (end-of-life) tire pyrolysis oil and/or $CO_2$.

In still another embodiment, said carbon black is a bio-based carbon black. For instance such carbon black can be obtained by bio-methane pyrolysis and/or from plant oils.

For instance, carbon black made from methane or bio-methane can involve plasma cracking the methane into carbon and hydrogen. Tires can be pyrolyzed turning them into steel, recovered/recycled carbon and oil/gas. Such oil can be used as feedstock for the production of new carbon blacks via known furnace processes. Plant oils, such as tall oil, can be used to produce carbon black, optionally in blends with petroleum or coal tar based feedstocks. In another example, $CO_2$ can be converted into carbon and water via a catalytic conversion process. This process is even carbon negative and can use $CO_2$ from industrial/ agricultural waste and/or, e.g., from the air. In this context, US20220169835 is incorporated herein for reference.

In still another embodiment, the hydrocarbon resin which is one or more of i) based on recycled monomers or bio-based monomers or a combination thereof, and ii) a plant resin, can be either based on monomers obtained from a reclaimed/used polymer feedstocks or from a bio-based polymer/material feedstock. In particular, the resin may be a plant resin, e.g., obtained from plants such as pine trees.

Preferably, the resin is selected from rosin resins and/or terpene resins. Terpene resins can for instance be based on beta pinenes and/or alpha pinenes.

In still another embodiment, one or more of the rubber compositions of one of the tire components mentioned herein, comprise recycled oil which is obtained in similar known processes as the polymers or resins described herein above.

In another embodiment, the oil is a vegetable oil such as one or more of soybean oil, sunflower oil, canola (rapeseed) oil, corn oil, coconut oil, cottonseed oil, olive oil, palm oil, peanut oil, and safflower oil.

In still another embodiment, the tire comprises at least one further tire component selected from:

C) a sidewall comprising a sidewall rubber composition (or third rubber composition) comprising
from 60 phr to 100 phr of elastomers selected from one or more of natural rubber,
polybutadiene rubber comprising monomers selected from one or more of recycled and bio-based monomers, and synthetic polyisoprene comprising monomers selected from one or more of recycled and bio-based monomers,
from 20 phr to 60 phr of a filler (predominantly) comprising one or more of recycled or bio-based silica and recycled or bio-based carbon black;

D) at least one bead comprising a bead coating rubber composition (or fourth rubber composition) comprising
from 80 phr to 100 phr of elastomers selected from one or more of natural rubber,
polybutadiene rubber comprising monomers selected from one or more of recycled and bio-based monomers, styrene butadiene rubber comprising monomers selected from one or more of recycled and bio-based monomers, polyisoprene comprising monomers selected from one or more of recycled and bio-based monomers,
from 90 phr to 150 phr of a filler comprising predominantly one or more of recycled or bio-based silica and recycled or bio-based carbon black, optionally
from 0.5 phr to 20 phr of plasticizer comprising one or more of a) oil which is one or more of i) based on recycled monomers, bio-based monomers or a combination thereof, and ii) vegetable oil, b) hydrocarbon resin which is one or more of i) based on recycled monomers, bio-based monomers or a combination thereof, and ii) a plant resin, and c) liquid olefinic polymers based on recycled monomers, bio-based monomers or a combination thereof;

E) at least one chafer comprising a chafer rubber composition (or fifth rubber composition) comprising
from 80 phr to 100 phr of elastomers selected from one or more of natural rubber, polybutadiene rubber comprising monomers selected from one or more of recycled and bio-based monomers and synthetic polyisoprene comprising monomers selected from one or more of recycled and bio-based monomers;
from 50 phr to 100 phr of a bio-based carbon black;

F) at least one apex comprising an apex rubber composition (or sixth rubber composition) comprising
from 90 phr to 100 phr of one or more of natural rubber, and synthetic polyisoprene comprising monomers selected from one or more of recycled and bio-based monomers; and G) an innerliner comprising an innerliner rubber composition (or seventh rubber composition) comprising:
90 phr to 100 phr of a butyl rubber comprising monomers selected from one or more of recycled and bio-based monomers,
30 phr to 100 phr of a filler including recycled or bio-based carbon black,
1 phr to 30 phr of plasticizer comprising one or more of a) oil which is one or more of i) based on recycled monomers, bio-based monomers or a combination thereof, and ii) vegetable oil, b) hydrocarbon resin which is one or more of i) based on recycled monomers, bio-based monomers or a combination thereof, and ii) a plant resin, and c) liquid olefinic polymers based on recycled monomers, bio-based monomers or a combination thereof.

By using one or more of these further tire components it is possible to provide an even more sustainable tire.

In relation to the innerliner composition, isobutene monomers can be for instance made from isobutyl alcohol on the basis of sugars. Such sugars may for instance be derived from biomass, such as from corn and/or cellulose.

In another embodiment, said tread rubber composition comprises from 55 phr to 90 phr of one or more of natural rubber and synthetic polyisoprene comprising monomers selected from one or more of recycled and bio-based monomers. Thus, the composition is predominantly made of polyisoprenic rubber.

In another embodiment, said tread rubber composition comprises from 50 phr to 200 phr of bio-based silica and/or predominantly bio-based silica. The tread rubber composition can for example comprise from 50 phr to 70 phr of silica or from 105 phr to 165 phr or from 50 phr to 95 phr of silica.

In yet another embodiment, said rubber coating composition comprises from 30 phr to 70 phr of bio-based silica, preferably from 40 phr to 65 phr of such silica.

In still another embodiment, one or more rubber compositions of the tire comprise each 2 phr to 20 phr of a bio-based silane.

Such silanes can for example be based on bio-ethanol. Examples of such silanes include, but are not limited to, bis-triethoxysilylpropyl disulfide (TESPD), such as SI 266 from Evonik, bis-triethoxysilylpropyl tetrasulfide (TESPT), such as SI 69 from Evonik, and/or trialkoxymercaptoalkyl silanes, such as SI 363 from Evonik.

In still another embodiment, the bio-based silane is selected from one or more of bis-triethoxysilylpropyl disulfide, bis-triethoxysilylpropyl tetrasulfide, blocked mercapto silanes, and unblocked mercapto silanes.

In another embodiment, one or more rubber compositions of the tire components comprise from 1 phr to 10 phr of at least one bio-based anti-degradant.

In still another embodiment, said bio-based anti-degradant is based on Kraft lignin, e.g., obtained from *Eucalyptus* trees, as Ligflex™ 601 from Suzano.

In still another embodiment, in said tread rubber composition said hydrocarbon resin is a terpene resin and/or rosin resin.

In still another embodiment, said terpene resin has one or more of a glass transition temperature within a range of 50°

C. to 90° C., a weight average molecular weight from 400 g/mol to 3000 g/mol, a softening point from 100° C. to 140° C.

In still another embodiment, said rosin resin has a softening point within a range of 60° C. to 100° C., preferably 70° C. to 90° C. The rosin resin may for instance be a gum rosin resin and/or is optionally dimerized.

In still another embodiment, one or more rubber compositions of the tire comprise 1 phr to 10 phr of vegetable oil.

In still another embodiment, at least one of said rubber plies comprises at least one reinforcement comprising recycled metal or recycled fabric material.

In still another embodiment, at least one of said rubber plies comprises a bio-based PET and/or a bio-based polyamide, in particular Nylon. Such materials can for example be obtained on the basis of sugars by known processes.

In particular, recycled metal can be recycled steel. Recycled fabric material can for instance be recycled PET and/or recycled polyamide, such as recycled Nylon. Such materials can also be present in hybrid cords, and/or combined with non-recycled cord materials.

In still another embodiment, at least one of said rubber plies comprises cords coated with a rubber coating composition, wherein the cords comprise one or more of recycled PET, recycled polyamide, bio-based PET, and bio-based polyamide.

In still another embodiment, the tire comprises a bead (preferably two beads) comprising recycled steel.

In yet another embodiment, at least one of said rubber plies comprises cords made of recycled steel. These rubber plies could for instance include belt plies and/or carcass plies (e.g. in truck applications).

In still another embodiment, the tread rubber composition comprises at least 70% recycled and/or bio-based ingredients, by weight. Preferably, it comprises up to 100% recycled and/or bio-based ingredients, by weight.

In still another embodiment, the rubber coating composition comprises at least 65% recycled and/or bio-based ingredients, by weight. Preferably, it comprise up to 100% recycled and/or bio-based ingredients, by weight.

In still another embodiment, the tread rubber composition comprises from 80% to 95% recycled and/or bio-based ingredients; and/or the rubber coating composition comprises from 75% to 90% recycled and/or bio-based ingredients, all by weight.

In still another embodiment, the tread rubber composition comprises from 60 phr to 90 phr of one or more of natural rubber and synthetic polyisoprene comprising monomers selected from one or more of recycled and bio-based monomers, preferably natural rubber, from 10 phr to 40 phr of styrene butadiene rubber comprising monomers selected from one or more of recycled and bio-based monomers, from 40 phr to 70 phr of rice husk ash silica, from 1 phr to 10 phr of a terpene resin.

In yet another embodiment, the tread rubber composition comprises one or more of: from 0.1 phr to 10 phr of a recycled or bio-based carbon black, from 0.1 phr to 10 phr of a Kraft lignin based antidegradant, from 0.1 phr to 10 phr of a bio-based silane, from 0.1 phr to 4 phr of a recycled zinc oxide (this term shall include herein also zinc oxide made from recycled zinc scrap), from 0.1 phr to 6 phr of bio-based wax, such as obtained from rice bran, and from 0.1 phr to 10 phr of (bio-based) stearic acid.

In an embodiment, the rubber composition can include at least one and/or one additional rubber. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Preferred rubber or elastomers may be in general natural rubber, synthetic polyisoprene, polybutadiene and styrene butadiene rubber.

In another embodiment, one or more of the rubbers are functionalized for the coupling to filler, in particular for the coupling to silica, with functional groups known in the art.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer.

In another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica with functional groups known in the art such as alkoxy, hydroxy, thiol, silanol and/and or other suitable groups.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95° C. to −110° C.

A glass transition temperature, or Tg, of an elastomer represents the glass transition temperature of the respective elastomer in its uncured state. A glass transition temperature of an elastomer composition represents the glass transition temperature of the elastomer composition in its cured state. A Tg is determined as a peak midpoint by a differential scanning calorimeter (DSC) at a temperature rate of increase of 20° C. per minute, according to ASTM D3418 or equivalent.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition(s) may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition(s) may further comprise from 1 phr to 10 phr, optionally from 1 phr to 5 phr, of one or more additional rubbers, such as SBR, SSBR, ESBR, PBD/BR, NR and/or synthetic polyisoprene. In another example, the composition(s) may include less than 5 phr, preferably less than 3, phr of an additional, optionally diene-based rubber or be also essentially free of such an additional optionally diene-based rubber. The terms "compound" and "composition" and "formulation" may be used herein interchangeably, unless indicated otherwise. The terms "rubber" and "elastomer" may also be used herein interchangeably.

Molecular weights of elastomers/rubbers, or resins, such as Mn (number average molecular weight), Mw (weight average molecular weight) and Mz (z average molecular weight), are determined herein using gel permeation chromatography (GPC) according to ASTM 5296-11 using polystyrene calibration standards, or equivalent.

In another embodiment, hydrocarbon resins mentioned herein preferably have a glass transition temperature Tg greater than 20° C. A Tg for resins is determined as a peak midpoint by a differential scanning calorimeter (DSC) at a temperature rate of increase of 10° C. per minute, according to ASTM D6604 or equivalent. Preferably, such a resin has a softening point above 70° C. as determined by ASTM E28 which might sometimes be referred to as a ring and ball softening point.

In another embodiment, the (hydrocarbon) resin is selected from the group consisting of coumarone-indene resin, C5 and/or C9 hydrocarbon resin, terpene polymers/resins, styrene/alphamethylstyrene resins, terpene phenol resin, rosin derived resins and copolymers and/or mixtures thereof. While not all of these resins are directly obtainable from plants, they may be synthesized from recycled monomers and/or bio-based monomers as mentioned herein above.

A coumarone-indene resin preferably contains coumarone and indene as monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cyclopentadiene, and diolefins such as isoprene and piperlyene. Coumarone-indene resins have preferably softening points ranging from 10° C. to 160° C. (as measured by the ball-and-ring method). Even more preferably, the softening point ranges from 30° C. to 100° C.

Several types of C5 and/or C9 resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins. C5 and/or C9 resins are typically available with softening points ranging from 10° C. to 120° C. Preferably, the softening point ranges from 30° C. to 100° C. Usually such hydrocarbon resins/resins are petroleum resin. However, such resins can also be obtained on the basis of recycled monomers and/or bio-based monomers as mentioned herein above. The same applies for other resins listed herein.

In an embodiment, C5 resins are aliphatic resins made from one or more of the following monomers: 1,3-pentadiene (e.g., cis or trans), 2-methyl-2-butene, cyclopentene, cyclopentadiene, and dicyclopentadiene.

In another embodiment, a C9 resin is a resin made from one or more aromatic monomers, preferably chosen from the group of indene, methylindene, vinyl toluene, styrene and methylstyrene (such as alphamethylstyrene).

In still another embodiment, a C9 modified resin is a resin (such as a C5 resin) which has been modified or functionalized with one or more aromatic monomers, preferably chosen from the group of indene, methylindene, vinyl toluene, styrene and methylstyrene (such as alpha methylstyrene).

Terpene resins are preferably comprised of polymers of at least one of limonene, alpha pinene, beta pinene and delta-3-carene. Such resins are available with softening points ranging from 10° C. to 135° C.

Terpene-phenol resins may be derived by copolymerization of phenolic monomers with terpenes such as limonenes, pinenes and delta-3-carene.

Representative for rosin resins and derivatives thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

A styrene/alphamethylstyrene resin is considered herein to be a (preferably relatively short chain) copolymer of styrene and alphamethylstyrene with a styrene/alphamethylstyrene molar ratio in a range of about 0.05 to about 1.50. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely its styrene and alphamethylstyrene contents and by its glass transition temperature, molecular weight and molecular weight distribution.

In one embodiment, said resin is partially or fully hydrogenated.

In an embodiment, the rubber composition comprises oil, such as processing oil. Oil may be included in the rubber composition as extending oil typically used to extend elastomers. Oil may also be included in the rubber composition by addition of the oil directly during rubber compounding. Oil used may include both extending oil present in the elastomers, and (process) oil added during compounding. Suitable oils may include various oils as are known in the art, including aromatic, paraffinic, naphthenic, and low PCA oils, such as MES, TDAE, SRAE and heavy naphthenic oils. As mentioned herein above, such or at least similar oils can also be obtained by recycling.

Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

If used, the rubber composition can include up to 70 phr of oil, preferably between 1 phr and 25 phr of oil. The oil content can be, alternatively, less than 10 phr of oil, preferably less than 5 phr of oil.

Glass transition temperatures Tg of oils are determined as a peak midpoint by a differential scanning calorimeter (DSC) at a temperature rate of increase of 10° C. per minute, according to ASTM E1356, or equivalent.

In an embodiment, the rubber composition comprises silica. Silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area is determined according to ASTM D6556 or equivalent and is described in the Journal of the American Chemical Society, Volume 60, Page 304 (1930). Silica may also be characterized by having a dibutylphthalate (DBP) absorption value in a range of 100 cm³/100 g to 400 cm³/100 g, alternatively 150 cm³/100 g to 300 cm³/100 g which is determined according to ASTM D 2414 or equivalent. Silica may have an average ultimate particle size, for example, in the range of 0.01 to 0.05 micron as determined by the electron microscope, although the silica particles may be even smaller, or possibly larger, in size.

In still another embodiment, the rubber composition may comprise pre-silanized and/or hydrophobated silica which may for instance have a CTAB adsorption surface area of between 130 m²/g and 210 m 2/g, optionally between 130 m²/g and 150 m 2/g and/or between 190 m²/g and 210 m 2/g, or even between 195 m²/g and 205 m 2/g. The CTAB (cetyl trimethyl ammonium bromide) method for determination of the silica surface area (ASTM D6845) is known to the person skilled in the art.

In an embodiment, a rubber composition may include carbon black. These carbon blacks have iodine absorptions ranging from 9 g/kg to 145 g/kg and a DBP number ranging from 34 cm³/100 g to 150 cm³/100 g. Iodine absorption values are determined according to ASTM D1510 or equivalent. Typically, the carbon black content is at least 0.1 phr.

In one embodiment, the rubber composition may contain sulfur containing organosilicon compounds or silanes. Examples of suitable sulfur containing organosilicon compounds are of the formula:

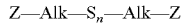

in which Z is selected from the group consisting of

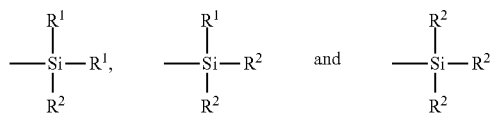

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

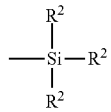

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608, 125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

In another embodiment, the rubber composition comprises from 0.1 phr to 5 phr of a cobalt salt, and more preferably from 0.2 phr to 2 phr of a cobalt salt. This content may be of particular interest if used in ply coating compounds as it may amongst others improve the adhesion of the rubber coating to the ply or belt material, in particular if such material is metal, preferably brass coated metal as for instance steel. However, in another embodiment the rubber composition may be essentially cobalt free, e.g. comprise less than 0.1 phr cobalt salt or 0 phr cobalt salt. The cobalt compound will typically be a cobalt salt of a fatty acid or a cobalt salt of an aliphatic or alicyclic carboxylic acid containing from 6 to 30 carbon atoms. Some representative examples of cobalt compounds which may be used include the cobalt salts, cobalt naphthanate, cobalt linoleate, cobalt stearate, cobalt oleate, cobalt acetate, cobalt neodecanoate, cobalt tallate, cobalt resinate, cobalt acetonate, or in situ salts prepared from cobalt hydroxide and an organic acid such as naphthenic acid, stearic acid, oleic acid, acetic acid, linoleic acid and the like. Additional cobalt compounds which may be used are known under the tradename Manobond™ C. Manobond™ C is a cobalt complex of an organic acid containing boron manufactured by Manchem Company.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

The tire of the present invention may for example be a pneumatic tire or nonpneumatic tire, a race tire, a passenger tire, an aircraft tire, an agricultural tire, an earthmover tire, an off-the-road (OTR) tire, a truck tire, or a motorcycle tire. The tire may also be a radial or bias tire.

In another embodiment, the tire is a 22.5 inch truck tire.

Vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect, the present invention is directed to a method of making a tire, preferably the tire according the first aspect of the invention, optionally including one or more of its embodiments.

In one embodiment, the method of making the tire comprises one or more steps of:
  obtaining one or more of styrene, isoprene, and butadiene monomers based on bio-based feedstocks and/or recycled feedstocks (such as those listed herein above);
  polymerizing one or more of the styrene, isoprene, and butadiene monomers to obtain one or more of styrene butadiene rubber, butadiene rubber, (synthetic) polyisoprene, and isoprene butadiene rubber;
  obtaining natural rubber;
  obtaining recycled and/or bio-based fillers, such as carbon black and/or silica, (optionally as described herein above);
  obtaining bio-based and or recycled C5 and/or C9 monomers, (optionally from feedstocks as described herein above);
  polymerizing the C5 and/or C9 monomers to obtain C5 and/or C9 hydrocarbon resin(s);
  obtaining at least one vegetable oil and/or obtaining at least one plant resin;
  mixing one or more of the i) rubbers and/or polyisoprene, ii) bio-based or recycled fillers, iii) resin(s), and iv) oil to obtain a rubber composition;
  curing the rubber composition.

BRIEF DESCRIPTION OF THE DRAWINGS

The invention will be described by way of example and with reference to the accompanying drawing FIG. 1 which is a schematic cross section of a tire comprising a plurality of tire components.

DETAILED DESCRIPTION OF THE INVENTION

FIG. 1 is a schematic cross-section of a tire 1 according to an embodiment of the invention. The tire 1 has a plurality of tire components such as a tread 10, an innerliner 13, a belt comprising four belt plies 11, a carcass ply 9, two sidewalls 2, and two bead regions 3, apexes 5 and beads 4. The example tire 1 is suitable, for example, for mounting on a rim of a vehicle, e.g. a truck. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7 which are also considered as tire components. Moreover, each bead region 3 comprises a chafer 15. As shown in FIG. 1, the example tread 10 may have circumferential grooves 20, each groove 20 essentially defining a U-shaped opening in the tread 10. The main portion of the tread 10 may be formed of one or more tread compounds.

While the embodiment of FIG. 1 suggests a plurality of tire components including for instance apexes 5, chippers 7, flippers 8, chafers 15 and overlay 12, such and further components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance a different number of grooves 20, e.g. less than four grooves.

In one embodiment, the tread 10 comprises a tread rubber composition comprising from 70 phr to 90 phr of natural rubber, from 10 phr to 30 phr of styrene butadiene rubber comprising recycled monomers, from 45 phr to 70 phr of rice husk ash silica, from 5 phr to 10 phr of a bio-based silane, as based on bio-ethanol. In addition, the rubber composition optionally has 1 phr to 5 phr of waxes, in particular from rice bran. Moreover, the composition comprises a bio-based antidegradant based on Kraft lignin, at a range of 1 phr to 10 phr. In the present non-limiting example, said composition comprises also from 2 phr to 15 phr of a bio-based resin, as terpene resin Sylvatraxx 4150 from Arizona Chemicals. Alternative terpene resins are available from multiple resin manufacturers, including but not limited to Dercolyte A115 from DRT. In other embodiments for truck tires, the resin range is preferably from 2 phr to 40 phr, preferably from 2 phr to 15 phr or to 10 phr. In case of other embodiments for passenger car tires, the resin range is preferably from 20 phr to 80 phr, or even more preferably from 50 phr to 75 phr. In addition, the rubber composition can optionally comprise from 1 phr to 10 phr of (bio-based) stearic acid. Moreover, the rubber composition comprises 1 phr to 10 phr of curatives, such as vulcanization accelerators listed herein above, and 0.1 phr to 5 phr (preferably 0.5 phr to 4 phr) of sulfur. The tread rubber composition, and also further compositions mentioned herein, may comprise further ingredients.

The belt plies 11 (which are examples of reinforced rubber plies) comprise cords, for instance preferably made of steel or textile material, which are coated with a cord coating rubber composition. In the present embodiment the cords are steel cords. In another embodiment those are made of recycled steel. The cord coating rubber composition comprises from 95 phr to 100 phr of natural rubber and from 40 phr to 70 phr of rice husk ash silica. In the present embodiment, the cord coating rubber composition further comprises a vegetable oil, herein 0.5 phr to 8 phr of a rapeseed oil. Moreover, the rubber composition comprises from 1 phr to 15 phr of a carbon black which is based on methane pyrolysis. A use of bio-methane further improves sustainability. The composition also comprises curatives within a range of 1 phr to 15 phr, antidegradants within a range of 1 phr to 10 phr which include herein the bio-based antidegradant Ligflex™ 601, silane within a range of 1 phr to 15 phr, in particular based on bio-ethanol, sulfur within a range of 4 phr to 15 phr, and zinc oxide within a range of 5 phr to 15 phr. In another embodiment, said zinc oxide is based on zinc scrap to further improve sustainability.

Moreover, in an embodiment, the tire 1 comprises two sidewalls 2 comprising a sidewall rubber composition comprising in a non-limiting example from 30 phr to 55 phr of bio-based polybutadiene. Moreover, the sidewall rubber composition comprises from 45 phr to 70 phr of natural rubber. As a filler, the sidewall rubber composition comprises from 30 phr to 50 phr of a methane pyrolysis based carbon black. In addition, the rubber composition comprises from 1 phr to 10 phr of stearic acid which is also bio-based. Moreover, the rubber composition comprises from 1 phr to 10 phr of antidegradants (including the bio-based antidegradant already mentioned above), from 1 phr to 10 phr of curatives, such as vulcanization accelerators listed herein above, 0.1 phr to 10 phr of metal oxides such as zinc oxide, and 0.1 phr to 5 phr of sulfur.

Said bead 4 comprises in an embodiment a bead coating (or bead filler) rubber composition comprising 100 phr of a recycled styrene butadiene rubber. Moreover the bead rubber composition comprises from 100 phr to 150 phr of a tall oil based carbon black, and from 5 phr to 30 phr of vegetable oil as rapeseed oil in the present embodiment. Moreover, the rubber composition comprises from 1 phr to 10 phr of a reactive phenol based resin. In addition, the rubber composition comprises from 1 phr to 10 phr of a said bio-based antidegradant, from 1 phr to 10 phr of curatives, such as vulcanization accelerators listed herein above, from 0.1 phr to 10 phr of metal oxides such as zinc oxide, and from 0.1 phr to 8 phr of sulfur.

Said chafers 15 comprise in an embodiment a chafer rubber composition comprising from 50 phr to 95 phr of recycled polybutadiene rubber, from 5 phr to 50 phr of natural rubber, from 50 phr to 90 phr of a bio-based carbon black, and optionally from 1 phr to 10 phr of a vegetable oil. Moreover, the rubber composition comprises from 0.5 phr to 10 phr of stearic acid, from 1 phr to 10 phr of the Kraft lignin based antidegradants, from 1 phr to 10 phr of curatives, such as vulcanization accelerators listed herein above, from 0.1 phr to 10 phr of metal oxides such as zinc oxide, and from 0.1 phr to 5 phr of sulfur.

The apexes 5 of the tire 1 comprise in an embodiment an apex rubber composition comprising 100 phr of natural rubber, a blend of bio-based silica as rice husk ash silica, within a range of 10 phr to 30 phr, and a recycled carbon black based on tire pyrolysis oil at a range of 30 phr to 40 phr, a vegetable oil (as rapeseed oil) within a range of 1 phr to 5 phr. Moreover, the composition comprises curatives within a range of 1 phr to 15 phr, said bio-based antidegradant within a range of 1 phr to 10 phr, silanes within a range of 1 phr to 10 phr, sulfur within a range of 2 phr to 10 phr and also zinc oxide within a range of 2 phr to 10 phr.

The innerliner 13 of the example tire 1 consists in an embodiment of an innerliner rubber composition comprising at least 90 phr, preferably 100 phr of bio-based butyl rubber and from 30 phr to 70 phr of a carbon black based on methane pyrolysis. Moreover, this rubber composition comprises from 1 phr to 10 phr of a vegetable oil, as rapeseed oil, 0.5 phr to 10 phr of (bio-based) stearic acid, from 1 to 10 phr of curatives.

While not shown herein, further tire components such as base tread(s), chimney(s), cushions or rubber strips may also be present and may have also rubber compositions comprising one or more of the recycled and/or bio-based ingredients disclosed herein. In general, specific examples of materials mentioned in one embodiment can also be used as materials in another embodiment disclosed herein.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising multiple tire components including:
   A) a tread comprising a tread rubber composition comprising
   from 10 phr to 100 phr of styrene butadiene rubber comprising monomers selected from one or more of recycled and bio-based monomers,
   from 0 phr to 90 phr of elastomers selected from one or more of natural rubber, polybutadiene rubber comprising monomers selected from one or more of recycled and bio-based monomers, and polyisoprene comprising monomers selected from one or more of recycled and bio-based monomers,
   from 40 phr to 250 phr of a filler comprising one or more of recycled or bio-based silica, and recycled or bio-based carbon black,
   from 1 phr to 90 phr of hydrocarbon resin which is one or more of i) based on recycled monomers, bio-based monomers or a combination thereof, and ii) a plant resin; and
   B) reinforced rubber plies comprising cords coated with a rubber coating composition comprising
   from 80 phr to 100 phr of elastomers selected from one or more of natural rubber and polyisoprene comprising monomers selected from one or more of recycled and bio-based monomers,
   from 30 phr to 90 phr of a filler comprising one or more of recycled or bio-based silica and recycled or bio-based carbon black
   wherein the tread rubber composition comprises from 80% to 95% of ingredients selected from recycled ingredients, bio-based ingredients, or combinations thereof, and
   wherein the rubber coating composition comprises from 75% to 90% of ingredient selected from recycled ingredients, bio-based ingredients, or combinations thereof, all by weight.

2. The tire according to claim 1, wherein the rubber coating composition further comprises from 0.1 phr to 20 phr of plasticizer comprising one or more of:
   a) oil which is one or more of i) based on recycled monomers, bio-based monomers or a combination thereof, and ii) vegetable oil,
   b) hydrocarbon resin which is one or more of i) based on recycled monomers, bio-based monomers or a combination thereof, and ii) a plant resin, and
   c) liquid olefinic polymers based on recycled monomers, bio-based monomers or a combination thereof.

3. The tire according to claim 1, wherein the tire comprises one or more further tire components:
   C) a sidewall comprising a sidewall rubber composition comprising
   from 60 phr to 100 phr of elastomers selected from one or more of natural rubber, polybutadiene rubber comprising monomers selected from one or more of recycled and bio-based monomers, and polyisoprene comprising monomers selected from one or more of recycled and bio-based monomers,
   from 20 phr to 60 phr of a filler comprising one or more of recycled or bio-based silica and recycled or bio-based carbon black;
   D) at least one bead comprising a bead coating rubber composition comprising
   from 80 phr to 100 phr of elastomers selected from one or more of natural rubber, polybutadiene rubber comprising monomers selected from one or more of recycled and bio-based monomers, polyisoprene comprising monomers selected from one or more of recycled and bio-based monomers,
   from 90 phr to 150 phr of recycled or bio-based carbon black,
   from 0.5 phr to 20 phr of plasticizers comprising one or more of
   a) oil which is one or more of i) based on recycled monomers, bio-based monomers or a combination thereof, ii) a vegetable oil,
   b) hydrocarbon resin which is one or more of i) based on recycled monomers, bio-based monomers or a combination thereof, and ii) a plant resin, and
   c) liquid olefinic polymers based on recycled monomers, bio-based monomers or a combination thereof;
   E) at least one chafer comprising a chafer rubber composition comprising
   from 80 phr to 100 phr of elastomers selected from one or more of natural rubber, polybutadiene rubber comprising monomers selected from one or more of recycled and bio-based monomers and polyisoprene comprising monomers selected from one or more of recycled and bio-based monomers;
   from 50 phr to 100 phr of a recycled or bio-based carbon black;
   F) at least one apex comprising an apex rubber composition comprising
   from 90 phr to 100 phr of one or more of natural rubber, and synthetic polyisoprene comprising monomers selected from one or more of recycled and bio-based monomers, and
   from 40 phr to 80 phr of a filler comprising predominantly recycled or bio-based carbon black;
   G) an innerliner comprising an innerliner rubber composition comprising:
   90 phr to 100 phr of a butyl rubber comprising monomers selected from one or more of recycled and bio-based monomers,
   30 phr to 100 phr of recycled or bio-based carbon black,
   from 1 phr to 30 phr of plasticizers comprising one or more of
   a) oil which is one or more of i) based on recycled monomers, bio-based monomers or a combination thereof, ii) a vegetable oil,
   b) hydrocarbon resin which is one or more of i) based on recycled monomers, bio-based monomers or a combination thereof, and ii) a plant resin, and
   c) liquid olefinic polymers based on recycled monomers, bio-based monomers or a combination thereof.

4. The tire according to claim 1, wherein said tread rubber composition comprises from 50 phr to 90 phr of one or more of natural rubber and polyisoprene comprising recycled or bio-based monomers.

5. The tire according to claim 1, wherein one or more of the rubber compositions each comprise from 2 phr to 20 phr of a bio-based silane.

6. The tire according to claim 1, wherein one or more rubber compositions comprise from 1 phr to 10 phr of at least one bio-based anti-degradant.

7. The tire according to claim 1, wherein the hydrocarbon resin in the tread rubber composition is selected from one or more of terpene resins and rosin resins.

8. The tire according to claim 1, wherein one or more of the rubber compositions comprise 1 phr to 10 phr of vegetable oil.

9. The tire according to claim 1, wherein at least one of said rubber plies comprises cords comprising recycled steel.

10. The tire according to claim 1, wherein the tread rubber composition comprises
    from 60 phr to 90 phr of one or more of natural rubber and synthetic polyisoprene comprising monomers selected from one or more of recycled and bio-based monomers,
    from 10 phr to 40 phr of styrene butadiene rubber comprising monomers selected from one or more of recycled and bio-based monomers,
    from 40 phr to 70 phr of rice husk ash silica,
    from 1 phr to 10 phr of a terpene resin.

11. The tire according to claim 10, wherein the tread rubber composition further comprises one or more of:
    from 0.1 phr to 10 phr of a recycled or bio-based carbon black,
    from 0.1 phr to 10 phr of a Kraft lignin based antidegradant,
    from 0.1 phr to 10 phr of a bio-based silane,
    from 0.1 phr to 4 phr of a recycled zinc oxide,
    from 0.1 phr to 6 phr of bio-based wax, and
    from 0.1 phr to 10 phr of stearic acid.

12. The tire according to claim 1, wherein said tread rubber composition comprises from 50 phr to 160 phr of bio-based silica.

13. The tire according to claim 12, wherein said silica is selected from rice husk ash silica and sugarcane ash silica.

14. The tire according to claim 12, wherein said rubber coating composition comprises from 30 phr to 70 phr of bio-based silica.

15. The tire according to claim 1, wherein at least one of the rubber plies comprises cords comprising recycled metal or recycled fabric material.

16. The tire according to claim 13, wherein the cords comprise one or more of recycled PET and recycled polyamide.

17. The tire according to claim 1, further comprising a bead made of recycled steel.

* * * * *